Dec. 10, 1968  J. J. MUNSON  3,415,044
CANE GATHERING SYSTEM FOR SUGAR CANE HARVESTERS
Filed Sept. 17, 1965  2 Sheets-Sheet 1

INVENTOR
Joseph J. Munson

BY Wilkinson, Mawhinney & Theibault
ATTORNEYS

Dec. 10, 1968      J. J. MUNSON      3,415,044
CANE GATHERING SYSTEM FOR SUGAR CANE HARVESTERS
Filed Sept. 17, 1965      2 Sheets-Sheet 2

INVENTOR
Joseph J. Munson
BY Wilkinson, Mawhinney & Theibautt
ATTORNEYS

United States Patent Office 3,415,044
Patented Dec. 10, 1968

3,415,044
CANE GATHERING SYSTEM FOR SUGAR
CANE HARVESTERS
Joseph J. Munson, Viewpoint, P.O. Box 243,
Houma, La. 70360
Filed Sept. 17, 1965, Ser. No. 488,208
5 Claims. (Cl. 56—119)

ABSTRACT OF THE DISCLOSURE

The invention, as disclosed, provides a pair of endless chains separated by a throat with an introductory mouth, the chains having flights adapted to come together at the mouth, where, through the intermediary of cam means, approach one another in substantially direct lines to embrace canes in a gathering function, after which the canes are moved through the throat.

The present invention relates to cane gathering system for sugar cane harvesters and has for a general object to improve the harvesting operation.

In the production of cane sugar, one of the important operations is harvesting the sugar cane. The operation should consist of properly cutting the cane stalks at approximately ground level, stripping off all leaves and trash and cutting off the tops at the proper position.

Formerly all sugar cane over the world was harvested by hand, using various types of hand knives for cutting and stripping. In more recent years, machine harvesting has replaced the hand operation in some areas. This is particularly true in the domestic areas of the United States.

The machine harvesting at best has not been satisfactory. The machine harvested cane is neither properly cleaned nor topped, which accounts for a substantial loss of sugar in the processing operation.

There is one main factor that is standing in the way of good machine havesting—a good gathering system preceding the harvester to straighten up the cane so that it may be properly stripped and topped. The stripping and topping do not appear difficult if the sugar cane is straightened up in front of the harvester as the first step in the harvesting operation.

Straightening up sugar cane that is not standing vertically on the ground, leaning and lodged in all directions, can be accomplished only by a combing action. Such action requires a comb that travels along with the harvesting machine with teeth or fingers (flights) that enter the standing cane at approximately 90° to the direction in which the harvesting machine is traveling, with no motion especially of their tips or of projecting portions in this direction and move upward substantially perpendicular to the ground. This is necessary in order to prevent the uprooting of the sugar cane and to provide a truly combing action. This is a difficult specification but is met by the present invention to produce an adequate cane gathering system which will completely satisfy all requirements.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 also shows the location of the receiving chains of the harvester at the rear of the gathering system.

Figure 2:
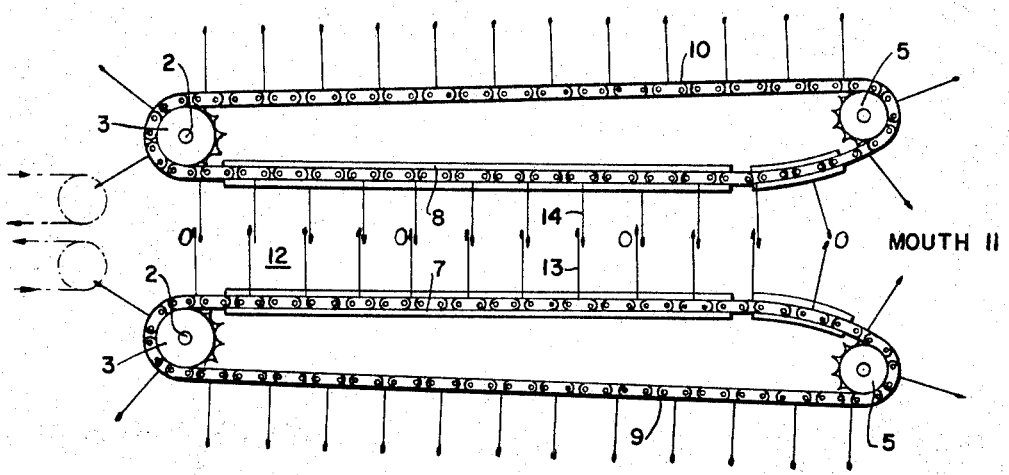
FIGURE 2 is a plan view of the 45° plane in which the gathering chains operate.
Figure 1:
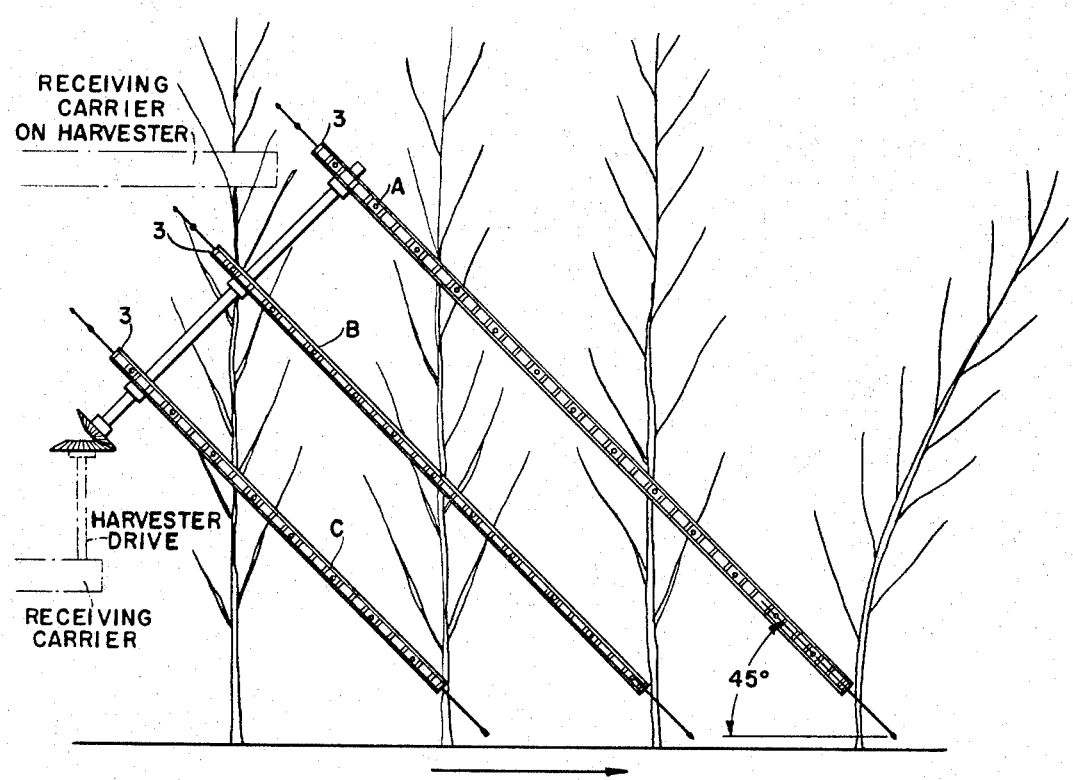
FIGURE 1 is a side elevational view showing how a series of gathering chains is employed in connection with the invention for erecting the canes to a vertical position.

Referring more particularly to the drawings and initially to FIGURES 1 and 2, a comb is shown, the teeth or flights of which are carried on a number of inclined flight chains on each side of the cane row. In this case, three such sets of chains A, B and C are indicated in FIGURE 1. More or less chains may be used to meet varying conditions, such as sugar cane heights, density, etc. The chains are driven from top shafts 2 by sprockets 3 thereon, said shafts 2 being driven by suitable means from the harvesting machine.

Figure 3:
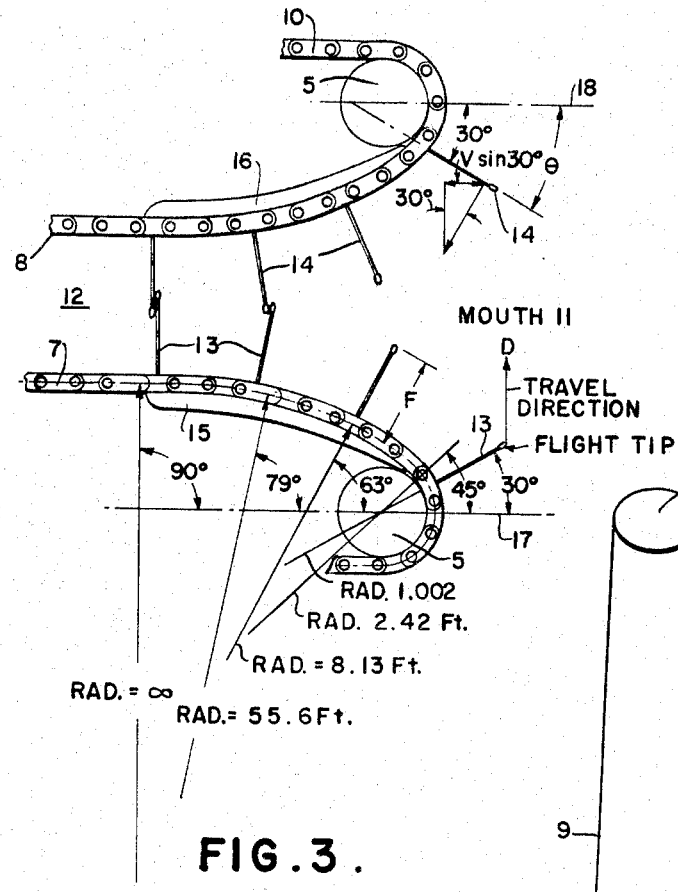
FIGURE 3 is a fragmentary plan view of the 45° plane, showing on an enlarged scale the lower portion of the gathering chains and cams together with some of the cam radii as calculated by the basic formula.

As shown in FIGURES 2 and 3, each gathering device A, B and C comprises two sets of endless chains mounted on an inclination, driven at a speed conforming to the forward ground speed of hasvester, from the upper sprockets 3 and trained about lower sprockets 5, the chains comprising confronting inner spaced upwardly moving runs 7 and 8 and outer descending runs 9 and 10. At their lower ends the chains diverge into flaring mouths 11 which lead upwardly into a throat 12 defined between the inner upwardly ascending runs 7 and 8, across which throat extend the flights 13 and 14, the inner ends or tip portions of which may slightly overlap after the flights have closed upon opposite sides of the canes or stalks which are indicated in FIGURE 1.

As shown more particularly in FIGURE 3, cams 15 and 16 are arranged as tracks for the inner runs of the chains. These cams or tracks 15 and 16 have reduced preferably tapering lower ends to fit between the lower sprockets 5 and the chains as the same pass around the lower sprockets to cause diverting of the paths of the chains from the peripheries of the sprockets 5 onto the cam tracks 15 and 16 which has the effect to reduce the distance across the mouths 11.

The slope of the cams 15 and 16 is plotted on successive arcs of progressively increasing radii.

The inner runs 7 and 8 of the chains travel upwardly and pass over sprockets 3 at the upper ends of the gathering devices and return through the outer runs 9 and 10 to the lower sprockets 5. These chains pass around sprockets 5 near mouth 11 and travel about the sprocket peripheries until just before they reach an approximate 30° position, FIGURE 3, when the chains leave the sprockets 5 and move over lower initial portions of the cams 15 and 16. These 30° positions are measured from lines 17 and 18, which lines are parallel to one another and in the forward direction of movement of the harvester.

In other words, when the flights 13 and 14, having passed through the lines 17 and 18 reach points 30° removed from these lines 17 and 18 measured at the respective centers of the lower sprockets 5, the chains at the incident points from which the flights 13 and 14 extend pass onto the respective cam tracks 15 and 16 and are thereby diverted from the peripheries of the sprockets 5 onto courses compelled by cam slope formations. At the 30° positions, the flights are over the cams, at which point the outer free end portions or tips of the flights rotate about a radius equal to the length of the flight 13 or 14 plus the radius of the incident cam in the 30° position. The radius of the cam is varied in accordance with the angle which the flight makes with the line of travel so that, as the flights attached to the chain pass over this position, the component of the flights tip circular or angular velocity parallel to the direction in which the harvester is traveling is equal to the speed of flight chains, the horizontal component of which is equal to the speed of the harvesting machine so that the flight tip in effect moves inward toward the cane row on a line substantially perpendicular to it, as shown by the line and arrow D in FIGURE 3. In other words, the flight tips are stopped, as far as motion parallel to the travel of the harvesting machine is concerned, all the way from the 30° position, FIGURE 3, up to where the flight chains come in contact with sprockets 3. After the flights pass the point where the radius of cam is shown equal to infinity, the flight chains are traveling in a straight line at a speed, the horizontal component of which is equal to the ground speed of the harvester.

The lengths of radii given in FIGURE 3 are the radii from the pitch line of the chain over the cams 6. The magnitude of these radii indicate clearly why sprockets cannot be used.

The curve of the cam, which is in contact with the roller chain, is really a basic sin curve which has a variation in radius for each infinitesimal angle. In fact, the curve itself is simply a plotted fundamental equation.

The important thing in the design of the gathering system is to make sure that the component of flight tip tangential velocity at any point, such as for instance, at the 30° position, FIGURE 3, is always equal to the speed of the flight chains in the inclined plane. The component at the 30° position is, of course, $V \sin 30°$ and likewise at all other positions in the curved chain at the lower sprockets. The radii of the cam for all positions may be determined as follows: Select the forward or working speed of the harvester, the angle of inclination of the flight chains, and the length of flight which should be long enough to reach slightly more than half way across the top of cane row or, where there are no cane rows, for as wide as is practical. For the case here presented, the forward speed of the harvester is 80 ft. per minute, the inclination of flight chains is 45° and the flight length is 1 ft.

Since the speed of the harvester is 80 ft. per minute, the flight chains must run in their inclined position at 80 ft. divided by sin of 45° which is .707 so that the speed of the flight chains in their inclined position is 113.15 ft. per minute.

The basic equation is:

$$\frac{S(R+F)}{R} \sin \theta = S$$

in which S equals speed of inclined flight chains, R the pitch line radius of sprocket or pitch line of chain on cam at the various angles which $R+F$ makes with a line parallel to the travel of harvester and $\theta$ the angle which $R+F$ makes with the line of travel. This equation is left in this form because a positive value must be assigned to F before it can be solved. It shows clearly that the flights revolve about a radius which is equal to $R+F$.

Figure 4:
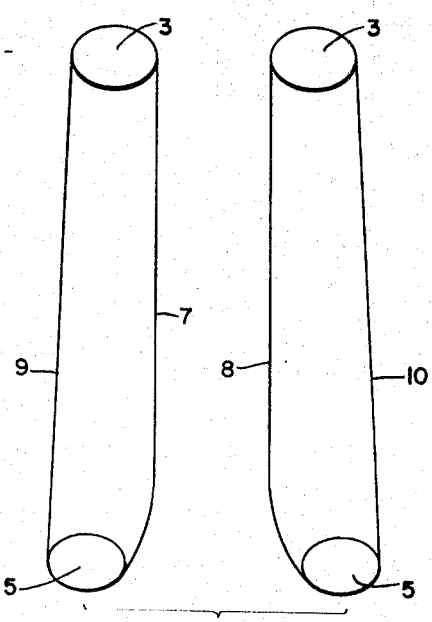
FIGURE 4 is a front view of the flight chain pitch lines of FIGURE 1.
Figure 5:
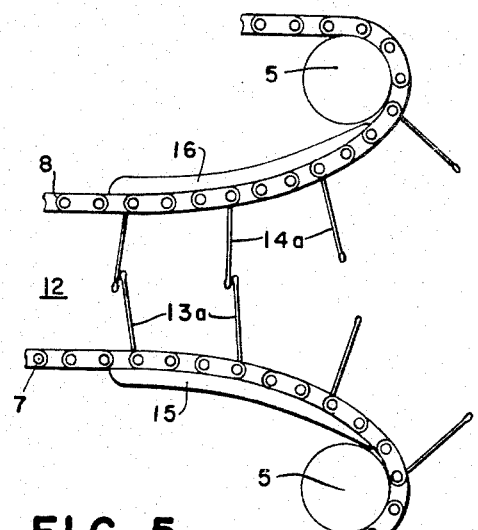
FIGURE 5 is a fragmentary plan view of the 45° plane showing on an enlarged scale the lower portion of the gathering chains and cams together with some of the cam radii as calculated by the basic formula and a further modified form of the invention.

Referring more particularly to FIGURE 5, a modified form of device is illustrated. In FIGURES 1 through 4, reference was made only to stopping part of the flight which constitutes the outer tip and such arrangement may possibly be the most practical. However, the whole flight itself can be stopped if it is put on the chain so that the base of the flight, namely, that portion connecting with the chain, follows the outer free end or tip portion at a proper angle which can be figured exactly. This arrangement will give a V-shaped angle between the flights on the opposite chains, as shown in FIGURE 4.

The position of these flights has been worked out by inclining the straight flights from base to tip in the direction of travel by the proper amount. This leaves the flight tip radius unchanged but decreases the radii of points inward from the tip which increases their circular velocity to compensate for the decrease in radii so that these points are stopped along with flight tip.

In other words, as points are moved inward from flight tip, they are placed so as to not only decrease radii but also the angle $\theta$, both of which increase rotative speed. The angle of this flight can be figured analytically and will prevent any movement of any part of the flight in a direction parallel with the travel of the harvester while the flights are passing around the curved portions of the chains.

Although I have disclosed herein the best forms of the invention known to me at this time, I reserve the right to all such modifications and changes as may come within the scope of the following claims.

What I claim is:

1. In a cane harvester, a gathering device comprising
    (a) at least one pair of endless chains having adjacent rearwardly moving ascending runs spaced apart to provide a cane receiving throat therebetween with a lower entrance mouth,
    (b) flights on the chains having free end portions extending toward one another across the throat, and
    (c) means at the mouth for causing the flights to enter the standing cane at approximately 90° to the direction of travel of the harvesting machine with substantially no motion of the free end portions of the flights in said direction of travel until such flights have achieved such entry, said means comprising
    (d) cams at opposite sides of the mouth positioned to be engaged as tracks for the chains, in which the slopes of the cams are plotted on constantly enlarging radii in directions from the mouth upwardly into the throat.

2. A gathering device as claimed in claim 1, in which the movement of the flights toward one another at the mouth conforms to the basic equation:

$$S(R+F)/R \sin \theta = S$$

in which S equals the speed of the inclined flight chains, R the pitch line of the chain on the cams at the various angles which $R+F$ makes with a line parallel to the travel of the harvester and $\theta$ the angle which $R+F$ makes with the line of travel.

3. In a cane harvester, a gathering device comprising
    (a) at least one pair of endless chains having adjacent rearwardly moving ascending runs spaced apart to provide a cane receiving throat therebetween with a lower entrance mouth,
    (b) flights on the chains having free end portions extending toward one another across the throat,
    (c) means at the mouth for causing the flights to enter the standing cane at approximately 90° to the direction of travel of the harvesting machine with substantially no motion of the free end portions of the flights in said direction of travel until such flights have achieved such entry,
    (d) upper and lower sprockets about which said chains are trained, said means comprising
    (e) cams positioned as tracks for the lower portions of the adjacent runs of the chains, said cams having lower portions entered between the chains and the lower sprockets so that the chains are diverted from the sprockets onto the cams as the chains pass into the mouth and ascend to the throat.

4. A gathering device as claimed in claim 3, in which the lower portion of said cams are tapered downwardly to points which intersect lines drawn through the centers of rotation of the lower sprockets and intersect at substantially 30° at such centers with longitudinal lines also passing through such sprocket centers in directions parallel to the direction of movement of the harvester so that in traveling upwardly from said 30° line the free ends of the flights will be substantially arrested in ascending movement but will travel substantially perpendicularly toward the longitudinal center line passing through the mouth and throat.

5. A gathering device as claimed in claim 3, in which the flights are mounted on the adjacent runs of the chains at acute angles so that the attached ends lead the free end portions incident to the travel of the chains over the cams whereby the flights of opposite runs of the chains converge mutually downwardly.

References Cited

UNITED STATES PATENTS

| | | | |
|---|---|---|---|
| 889,226 | 6/1908 | Hall | 56—119 |
| 2,480,209 | 8/1949 | Aasland | 56—119 |
| 2,924,056 | 2/1960 | Morgan et al. | 56—119 XR |

ROBERT E. BAGWILL, *Primary Examiner.*

U.S. Cl. X.R.

56—98; 198—162